United States Patent [19]

Ono et al.

[11] Patent Number: 4,498,222
[45] Date of Patent: Feb. 12, 1985

[54] CLINCHING PROCESS OF BUCKLE BASE AND WIRE ROPE

[75] Inventors: Katsuyasu Ono, Kanagawa; Tomosaburo Sato, Saitama, both of Japan

[73] Assignee: NSK-Warner K.K., Japan

[21] Appl. No.: 500,443

[22] Filed: Jun. 2, 1983

[30] Foreign Application Priority Data

Jun. 20, 1982 [JP] Japan .................................. 105697

[51] Int. Cl.$^3$ ...................... B21D 39/00; B23P 11/00
[52] U.S. Cl. ........................................ 29/509; 29/517; 29/522 R; 24/687; 24/703; 403/284
[58] Field of Search .................. 29/509, 522 R, 517, 29/518, 519; 24/687, 703; 403/284, 274

[56] References Cited

U.S. PATENT DOCUMENTS

| | | | |
|---|---|---|---|
| 2,183,641 | 12/1939 | Double | 29/509 |
| 2,236,180 | 3/1941 | Kost | 29/509 |
| 2,476,731 | 7/1949 | Hobbs, Jr. | 29/518 X |
| 4,361,948 | 12/1982 | Omata | 29/517 |
| 4,373,830 | 2/1983 | Dkesue | 29/509 X |

FOREIGN PATENT DOCUMENTS

| | | | |
|---|---|---|---|
| 561587 | 4/1957 | Italy | 29/522 |
| 56-106665 | 8/1981 | Japan . | |
| 700142 | 11/1953 | United Kingdom | 403/274 |
| 1408499 | 10/1975 | United Kingdom . | |

*Primary Examiner*—Charlie T. Moon
*Attorney, Agent, or Firm*—Cantor and Lessler

[57] ABSTRACT

Disclosed herein is a process for clinching a wire rope on a buckle base, which comprises the following consecutive steps:

subjecting a starting anchor block material and the wire rope in combination to a first clinching operation to obtain a preformed anchor block bearing steps therein; and subjecting the preformed anchor block and the buckle base in combination to a second clinching operation to clinch the resultant anchor block on the buckle base, which second clinching operation is applied in a direction different from the first clinching operation. Owing to the first and second clinching operations carried out in directions different from each other, the resulting stresses are scattered and the anchor block is thus protected from being overstressed.

4 Claims, 14 Drawing Figures

CLINCHING PROCESS OF BUCKLE BASE AND WIRE ROPE

BACKGROUND OF THE INVENTION (1) Field of the Invention:

This invention relates to a process for clinching a buckle base and wire rope together, and more particularly to a process of clinching a buckle base and wire rope together by means of an anchor block in two steps.

(2) Description of the Prior Art:

For the fabrication of a buckle assembly such as that used in a vehicle seat belt, an anchor block, wire rope, buckle base and the like have heretofore been put together by clinching them. Such a conventional buckle assembly was however accompanied by a drawback that a clinching stress was applied only in one direction and the anchor block was overstressed because the anchor block has heretofore been shaped by cutting work or the like and a pressing force was applied to the anchor block only when clinching the anchor block on the buckle base.

FIG. 10 illustrates one way of clinching such an anchor block as formed by cutting work on a buckle base. As shown in FIG. 10(a), a raised portion 121 is formed by cutting a starting anchor block material. The raised portion 121 is clinched vertically in directions indicated by B as depicted in FIG. 10(b) and is thus formed into hexagonal configurations as illustrated in FIG. 10(c). Since this prior art process applies a clinching force in one direction only, the stress is not dispersed and the anchor block may be overstressed.

It may also be contemplated to secure an anchor block on a buckle base by means of certain fastening members without subjecting the anchor block to an overstress. U.K. Patent Specification No. 1,408,499 naming Frederick John Setters as a sole inventor and published on Oct. 1, 1973 discloses an anchor block (i.e., ferrule) having grooves in both side walls thereof and a buckle base including a pair of side walls which bear keys or ribs. The anchor block is secured on the buckle base by inserting the keys or ribs into their corresponding grooves. This method is certainly effective in protecting an anchor block from being overstressed but requires some machining work to form the grooves and keys or ribs.

SUMMARY OF THE INVENTION

With the foregoing in view, the present invention has as its object the provision of a process for clinching a wire rope to a buckle base by means of an anchor block without overstressing the anchor block.

It has been found that the clinching stress can be scattered when the forming of an anchor block is carried out by clinching a starting anchor block material in directions different from the clinching directions upon securing the anchor block on the buckle base so as to clinch the anchor block in two directions which are different from each other.

Accordingly, this invention provides a process for clinching a wire rope on a buckle base, which process comprises the following consecutive steps:

subjecting a starting anchor block material and the wire rope in combination to a first clinching operation to obtain a performed anchor block bearing steps thereon; and subjecting the preformed anchor block and the buckle base in combination to a second clinching operation to clinch the resultant anchor block on the buckle base, which second clinching operation is applied in a direction different from the first clinching operation.

Since the clinching operations are carried out on the anchor block in at least two directions which are different from each other, stresses are scattered and the anchor block is thus protected from being overstressed.

The above and other objects, features and advantages of the present invention will become apparent from the following description and the appended claims, taken in conjunction with the accompanying drawings.

BRIEF DESCRIPTION OF THE DRAWINGS

FIG. 10(a) illustrates the anchor block immediately after its cutting-out from a starting material and FIGS. 10(b) and 10(c) show the anchor block in the clinching operation and after the hexagonal clinching operation respectively.

DESCRIPTION OF THE PREFERRED EMBODIMENT

Figure 1:
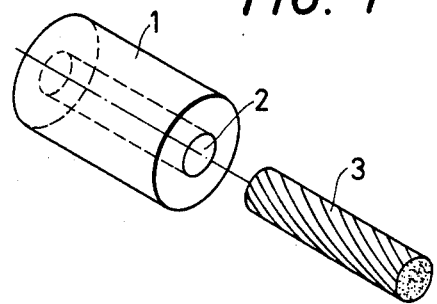
FIG. 1 shows a starting anchor block material and one end portion of a wire rope.
Figure 2:
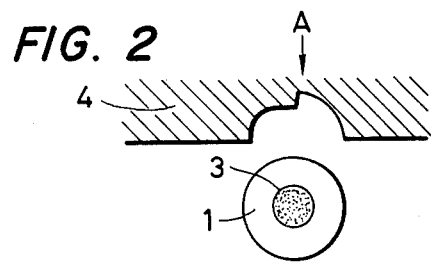
FIG. 2 illustrates an upper die and its matching lower die used to clinch the starting anchor block material and wire rope of FIG. 1.
Figure 3:
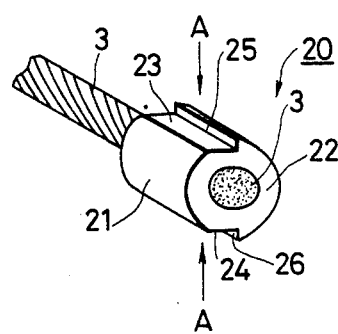
FIG. 3 is a perspective view of a preformed anchor block with the wire rope clinched therein.

Referring to the accompanying drawings, FIGS. 1 to 6 illustrate various steps of the process according to this invention. As shown in FIG. 1, a wire rope 3 is inserted into a central hole 2 of a starting anchor block material 1. Thereafter, the starting anchor block material 1 is clinched, as illustrated in FIG. 2, in the directions indicated by the arrows A by means of an upper die 4 and lower die 5, thereby preforming an anchor block bearing such steps as shown in FIG. 3. In FIG. 3, the arrows A indicate the directions of the preforming clinching operation and the thus-preformed anchor block 20 consists of a raised portion 21 and a base 22. The raised portion 21 is formed into side walls 23,24 at both sides thereof and the base 22 terminates upwardly in steps 25,26. As shown in the drawing, the wire rope 3 is clinched in the preformed anchor block 20.

By the way, it is not always necessary to carry out the step of forming the starting anchor block material into preformed anchor block bearing the steps and the step of clinching the wire rope 3 in the starting anchor block material at the same time. For example, it is also feasible to temporarily secure the starting anchor block material on the wire rope 3 in advance and then to form the raised portion in the starting anchor block material.

Figure 4:
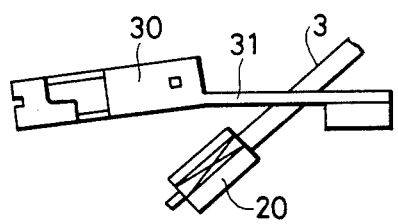
FIG. 4 is a side view of a buckle base through which the wire rope has been inserted together with the preformed anchor block.
Figure 5:
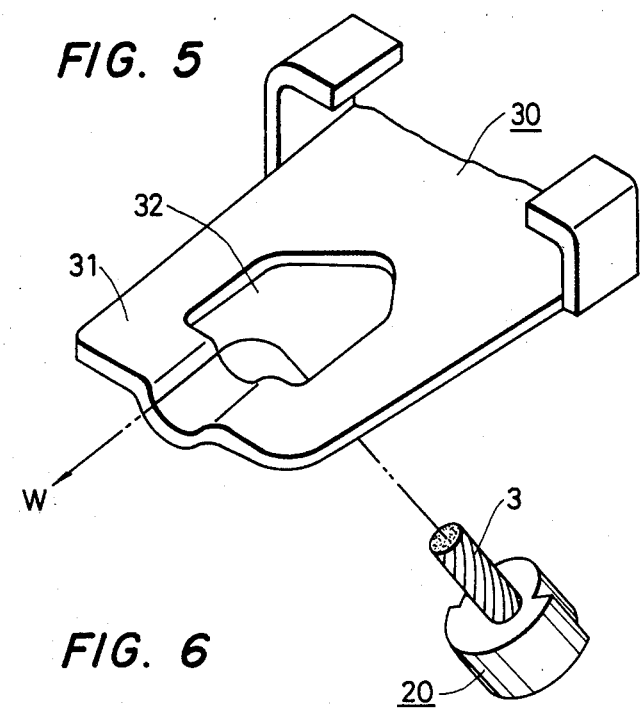
FIG. 5 illustrates the way of inserting the wire rope with the preformed anchor block clinched thereon through the buckle base.

In the next step, the wire 3 is inserted into the buckle base 30 from the lower side. FIG. 5 illustrates this way of insertion as a perspective view. In FIGS. 4 and 5, numerals 30, 31 and 32 indicate a buckle base, bottom wall and window respectively. Namely, the wire rope 3 is inserted from the lower side in the direction indicated by the arrow W.

Figure 6:
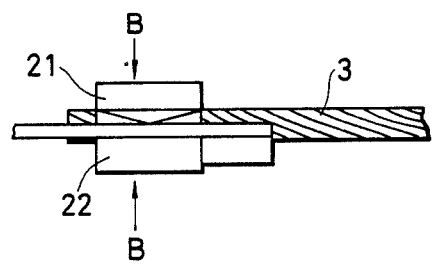
FIG. 6 is a side view in which the preformed anchor block has been brought into abutment against the lower surface of the buckle base.
Figure 7:
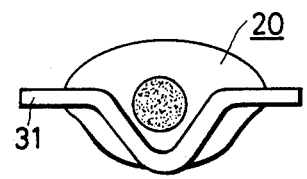
FIG. 7 illustrates an anchor block clinched into an elliptical shape.
Figure 8:
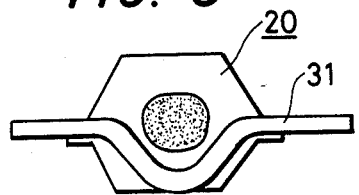
FIG. 8 depicts an anchor block clinched into a hexagonal shape.

Then, the steps 25,26 of the preformed anchor block are brought into abutment against the lower surface of the bottom wall 31 from a point underneath the window and the raised portion 21 is caused to project above the bottom wall 31. This state is depicted in FIG. 6. A pressing force is thereafter applied in the directions indicated by the arrows B while maintaining the buckle base and preformed anchor block in the above positions, thereby clinching the anchor block onn the buckle base. FIG. 7 shows an anchor block clinched into an elliptical shape, while FIG. 8 depicts an anchor block clinched into a hexagonal shape.

Figure 9A:
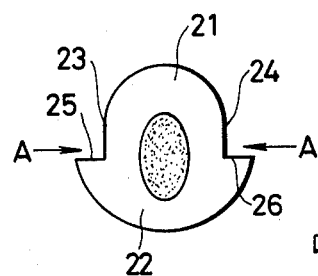
FIGS. 9(a), 9(b) and 9(c) show an anchor block after the first clinching operation, in the second clinching operation and after the hexagonal clinching operation, respectively.
Figure 9B:
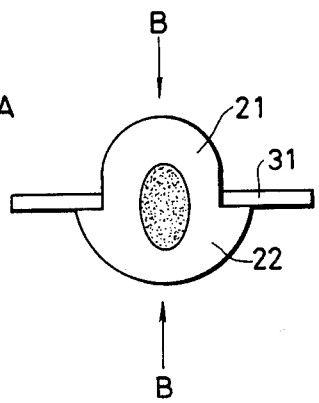
Figure 9C:
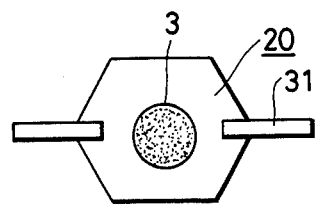
Figure 10A:
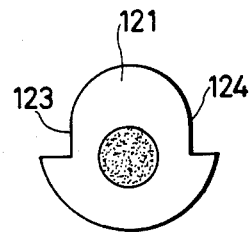
FIGS. 10(a), 10(b) and 10(c) illustrate forming steps of an anchor block in accordance with the conventional cutting method.
Figure 10B:
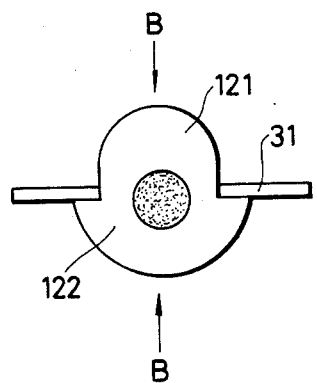
Figure 10C:
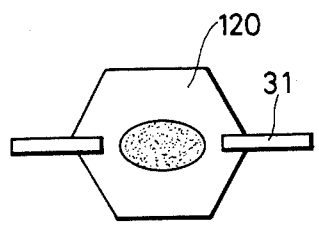

FIGS. 9(a) through 9(c) illustrate clinching forces applied in accordance with the process of this invention. FIG. 9(a) shows the first clinching operation, in which pressing forces are applied as indicated by the arrows A, namely, from both sides to the cylindrical starting anchor block material so as to preform the anchor block having the upper raised portion 21 and lower base 22. Then, as shown in FIG. 9(b), the steps 25,26 formed at the top surface of the base 22 are brought into abutment against the lower surface of the buckle base and the raised portion 21 is caused to project upwardly from the window 32. By clinching the thus-preformed anchor block vertically in the directions indicated by the arrows B, the preformed anchor block is clinched further into the hexagonal shape shown in FIG. 9(c). As apparent from the figures, the first clinching directions A are perpendicular to the second clinching directions B and stresses due to the pressing operations are scattered, thereby protecting the anchor block from excessive forces.

Since the clinching operations are carried out in at least two directions which are different from each other, stresses are scattered. In a preferred embodiment, the wire rope is inserted into the buckle base from the lower side thereof and no wider portions are thus required for the window 22, contrary to the conventional process (see, for example, Japanese Patent Laid-open No. 106665/1981 of Aug. 25, 1981, naming Mutsumi Sugimoto as a sole inventor) in which an anchor block was inserted into the buckle base from the upper side thereof. The wire rope, anchor block and buckle base are fully clinched by the second clinching operation. (In the prior art process, a wire was completely clinched to an end metal fitting by the first clinching operation and the second clinching operation was merely to fix the end metal fitting on a buckle base.)

Despite of the rather simple process, this invention enjoys numerous merits as mentioned above and the working efficiency upon assembling wire ropes on their correponding buckle bases has been extremely improved.

Although two clinching operations were applied in different directions in the above embodiment, it may be possible to fix the anchor block by three or more clinching operations which are applied in different directions.

Having now fully described the invention, it will be apparent to one of ordinary skill in the art that many changes and modifications can be made thereto without departing from the spirit or scope of the invention as set forth herein.

What is claimed is:

1. A process for clinching a wire rope on a buckle base, which process comprises the following consecutive steps:

subjecting a starting anchor block metal sleeve and the wire rope in combination to a first clinching plastic deforming operation to form a preformed anchor block bearing steps extending up radially outwardly thereon; and subjecting the preformed anchor block and the buckle base in combination to a second clinching plastic deforming operation to clinch the resultant anchor block on the buckle base, which second clinching operation is applied in a direction at an angle or angles substantially different from the first clinching operation to scatter the resulting stresses.

2. The process as claimed in claim 1, wherein the second clinching operation is applied in a direction perpendicular to the first clinching operation.

3. A process for clinching a wire rope on a buckle base, which process comprises the following consecutive steps:

fixing a starting anchor block metal sleeve on the wire;

subjecting the starting anchor block material to a first clinching operation to form a preformed anchor block bearing steps extending radially outwardly thereon; and subjecting the preformed anchor block and the buckle base in combination to a second clinching operation to clinch the resultant anchor block on the buckle base, which second clinching operation is applied in a direction at an angle or angles substantially different from the first clinching operation to scatter the resulting stresses.

4. The process as claimed in claim 3, wherein the steps are brought into abutment against the lower surface of the buckle base.

* * * * *